W. A. S. MAUK.
TIRE MOLD FORMING MACHINE.
APPLICATION FILED MAY 17, 1916.

1,320,021.

Patented Oct. 28, 1919.
10 SHEETS—SHEET 1.

Inventor
W. A. S. Mauk
By A. M. Wilson
Attorney

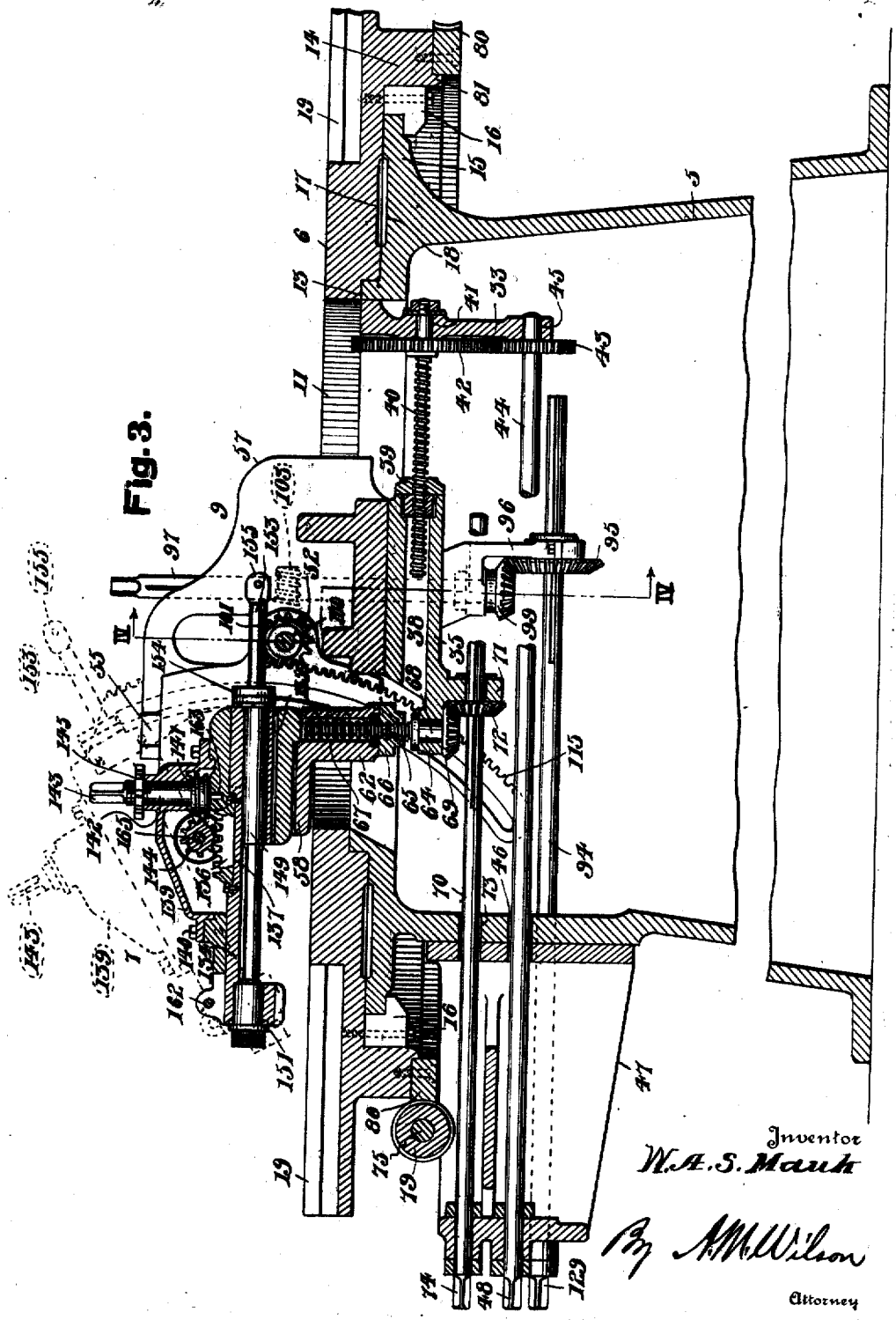

W. A. S. MAUK.
TIRE MOLD FORMING MACHINE.
APPLICATION FILED MAY 17, 1916.
1,320,021.
Patented Oct. 28, 1919.
10 SHEETS—SHEET 3.
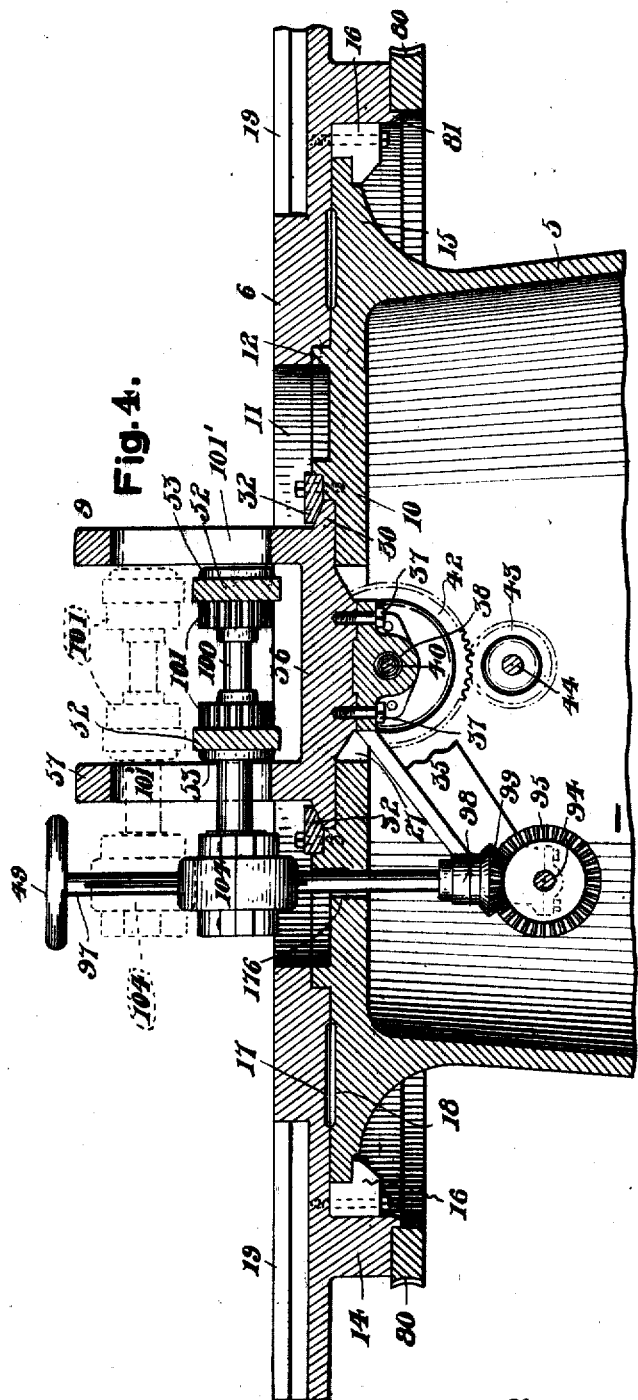
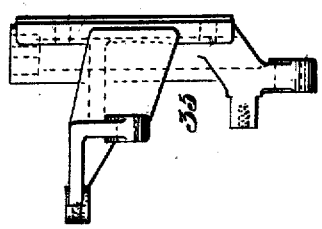
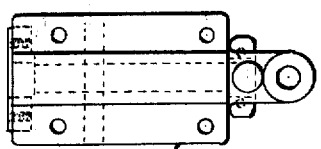
Inventor
W. A. S. Mauk
By N. M. Wilson
Attorney

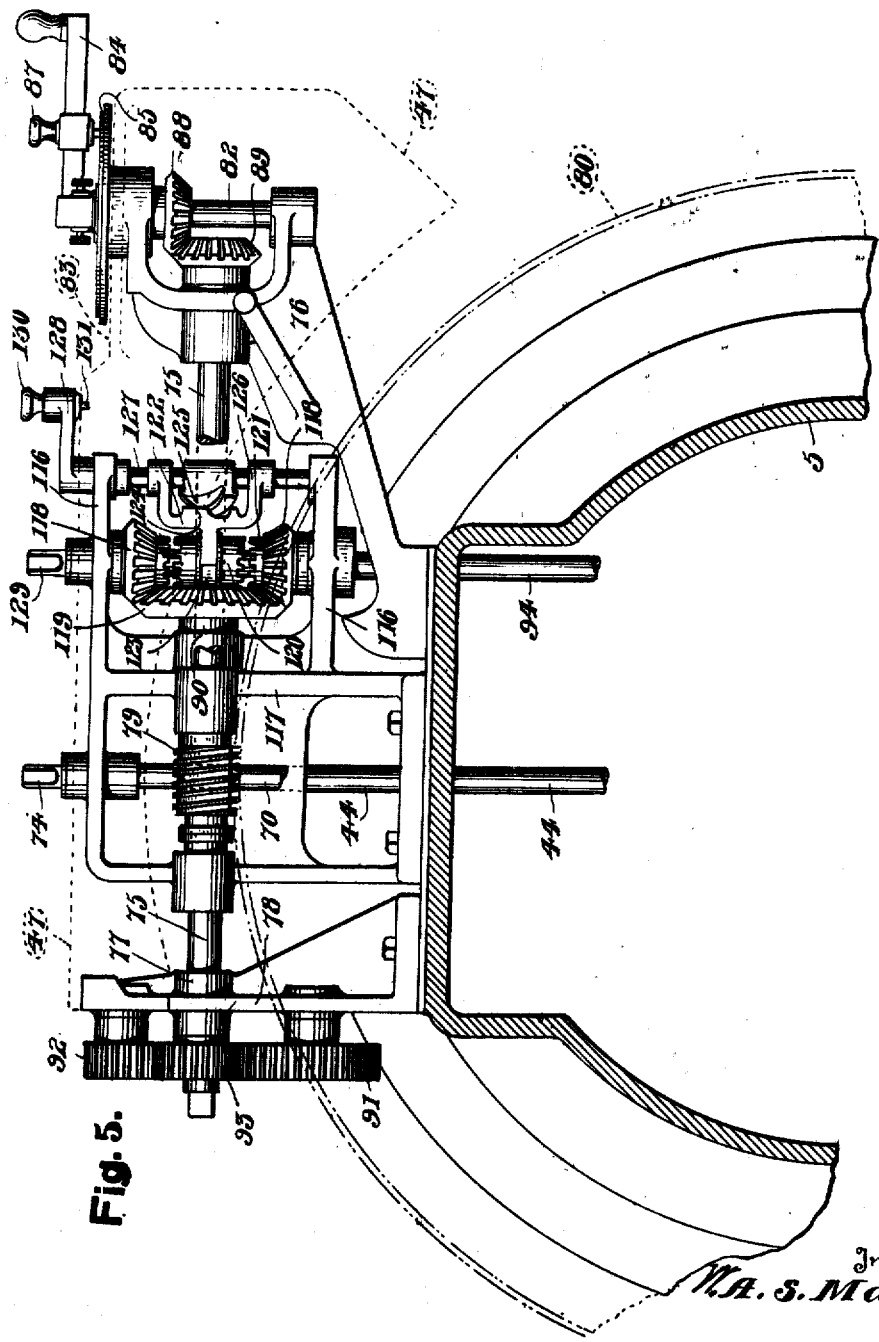

W. A. S. MAUK.
TIRE MOLD FORMING MACHINE.
APPLICATION FILED MAY 17, 1916.
1,320,021.
Patented Oct. 28, 1919.
10 SHEETS—SHEET 5.
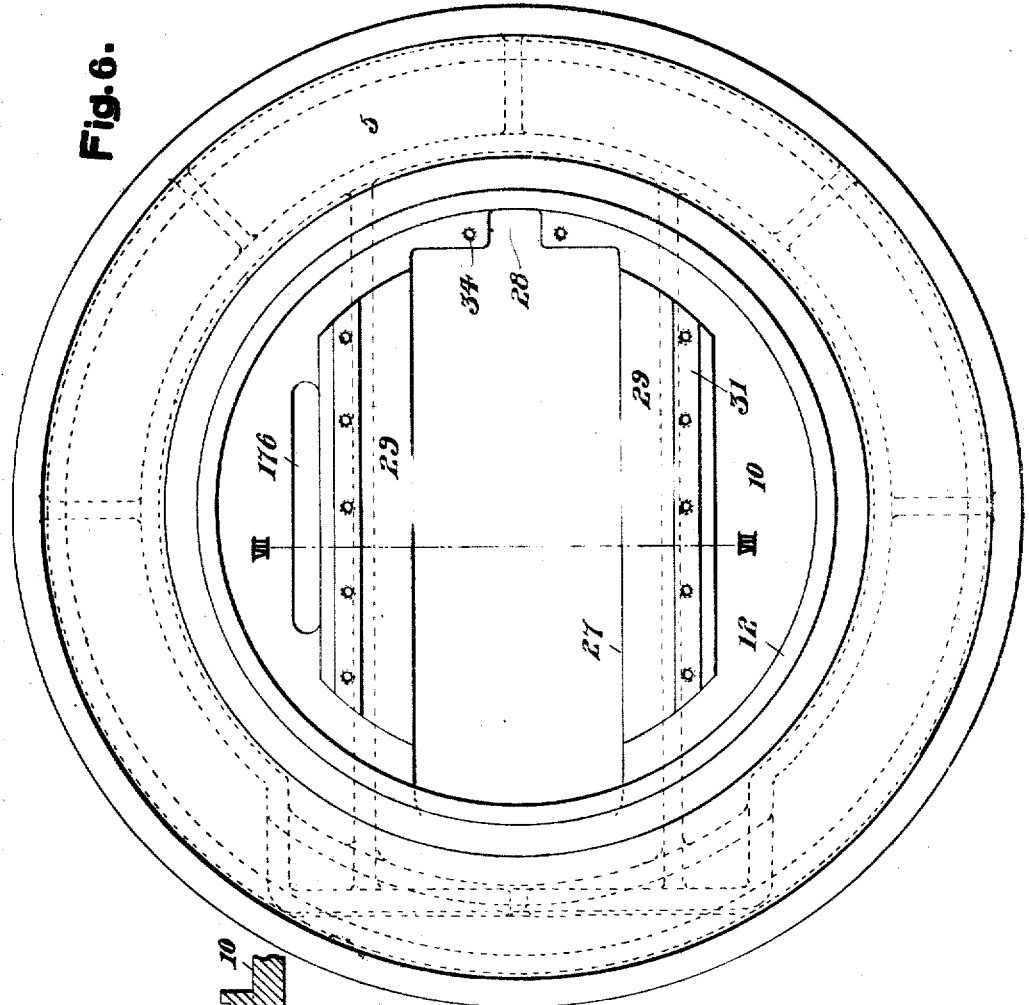
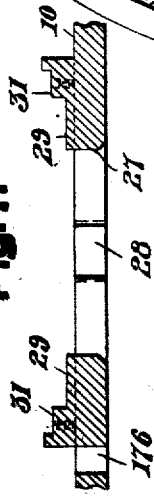
Inventor
W. A. S. Mauk
By A. M. Wilson
Attorney

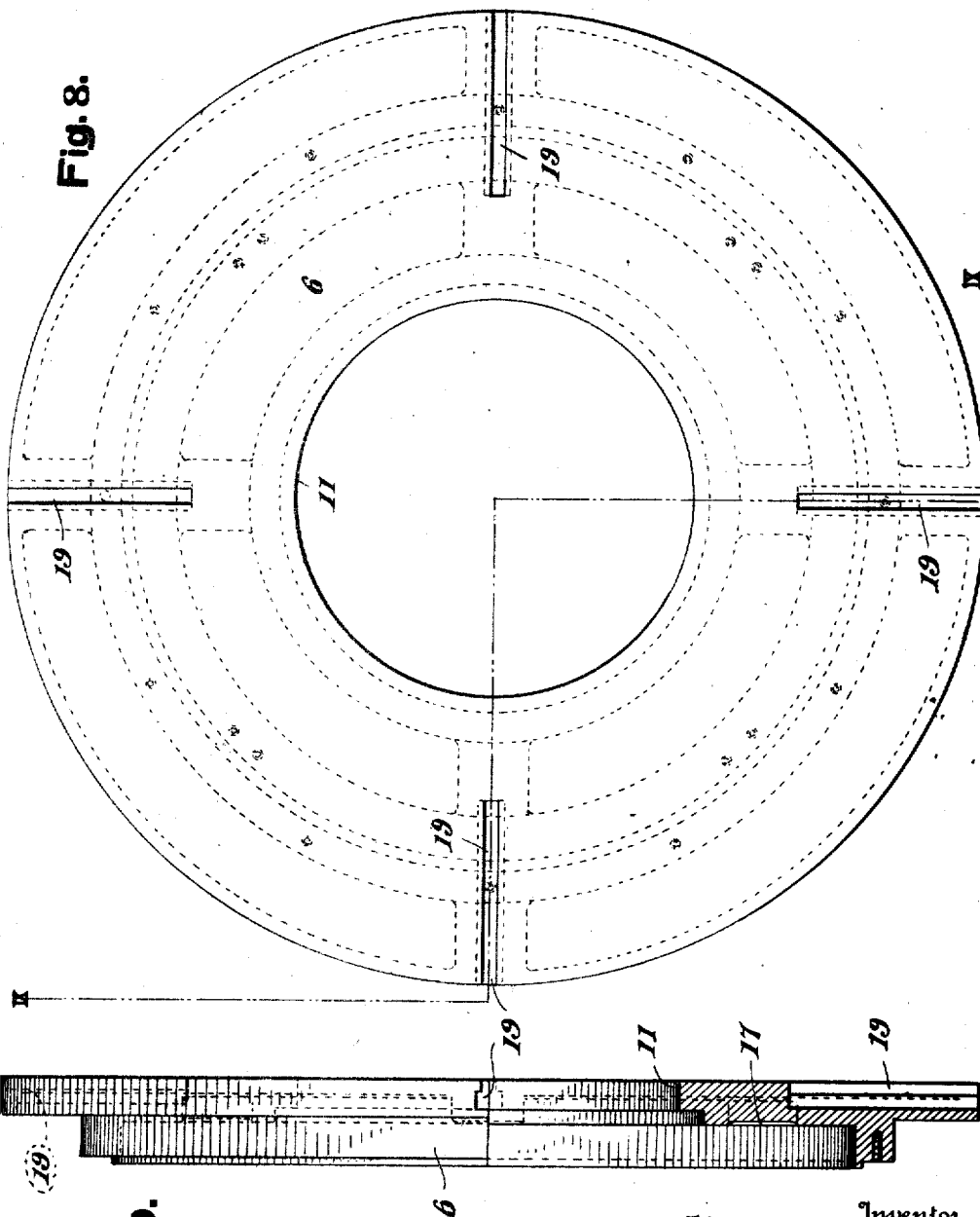
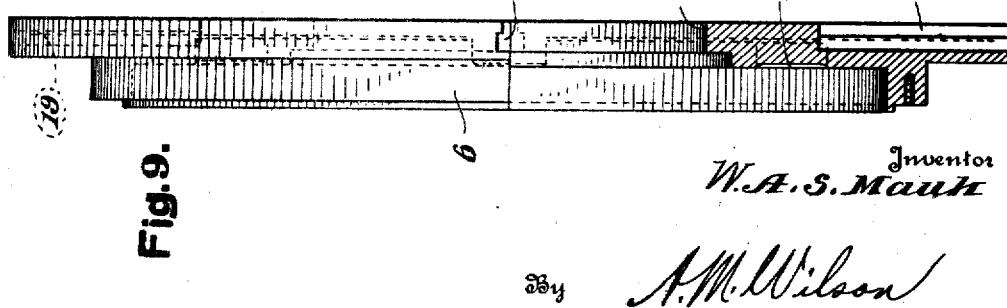

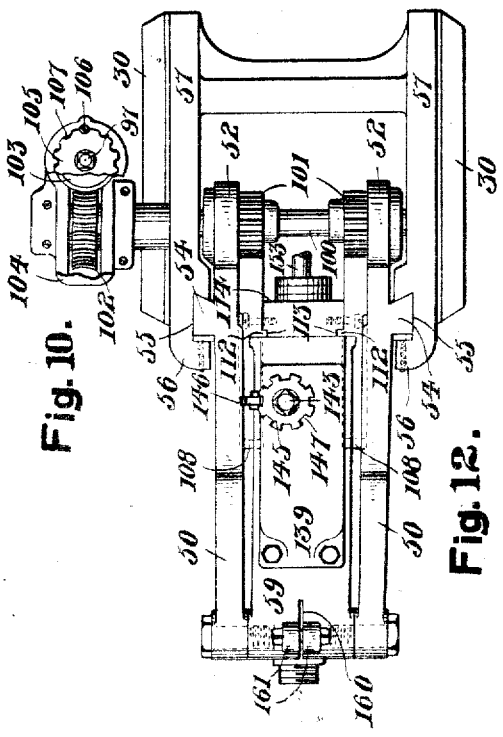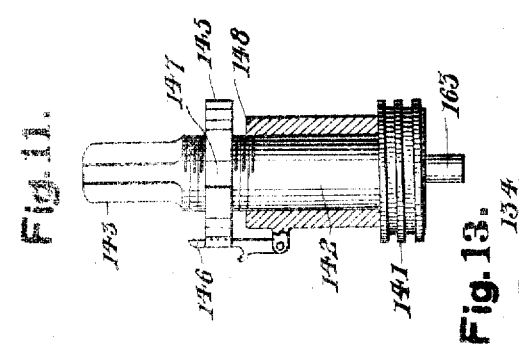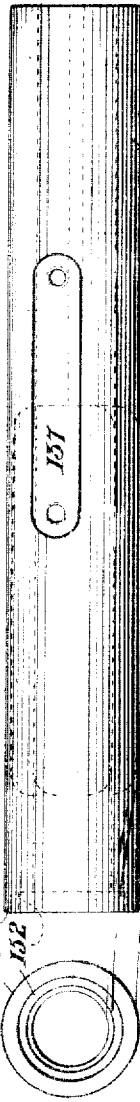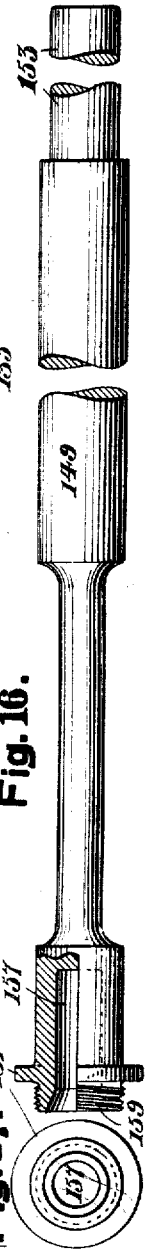

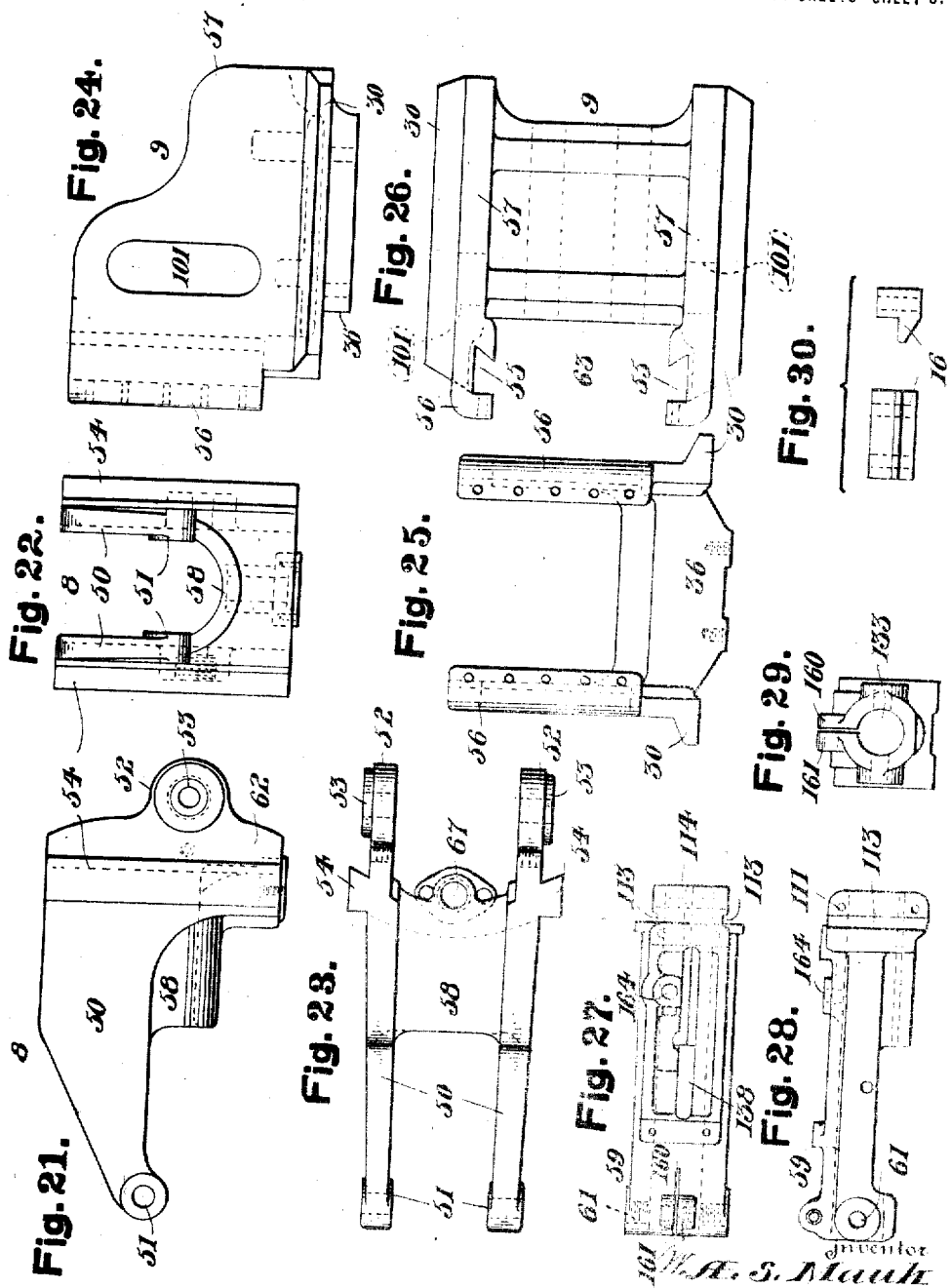

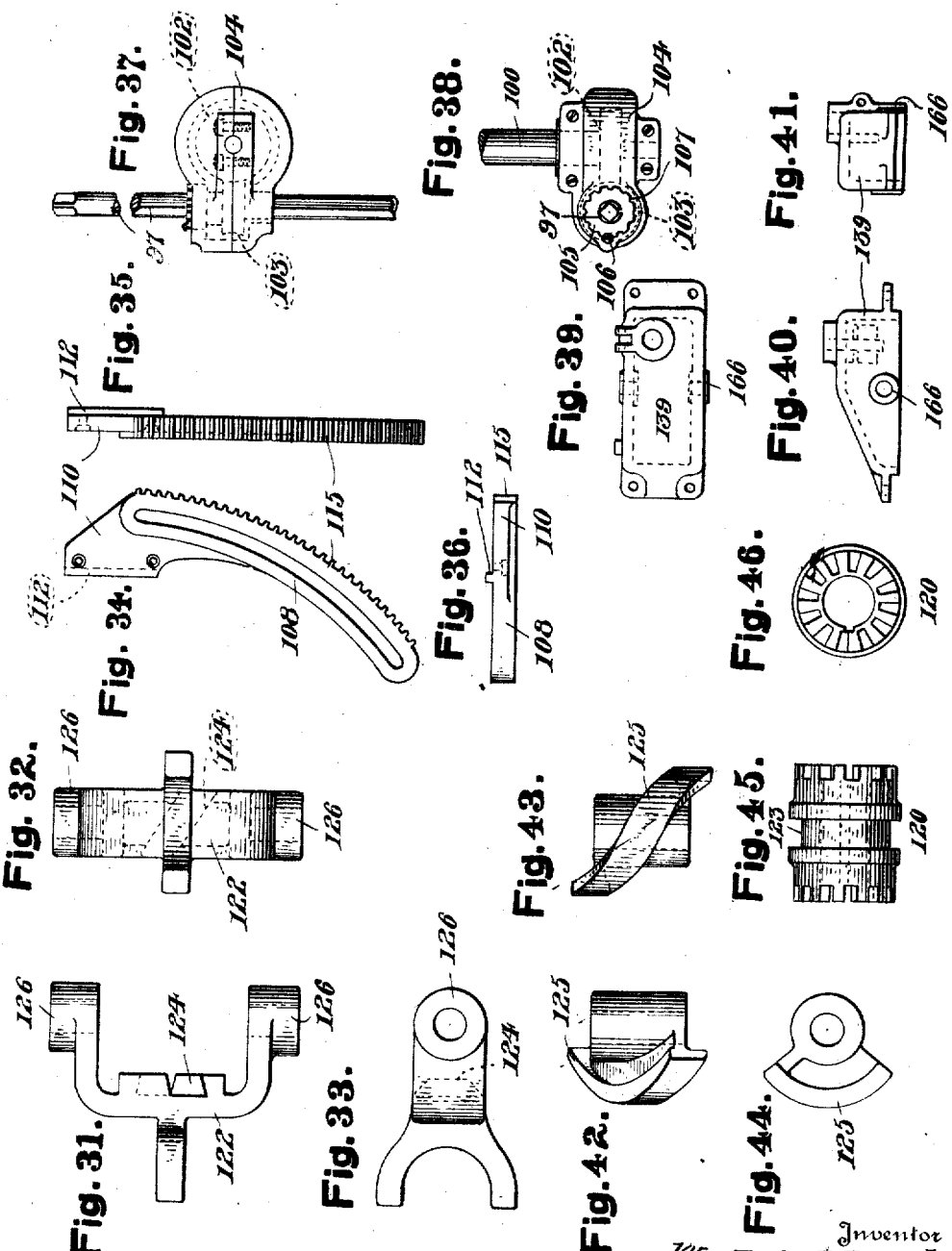

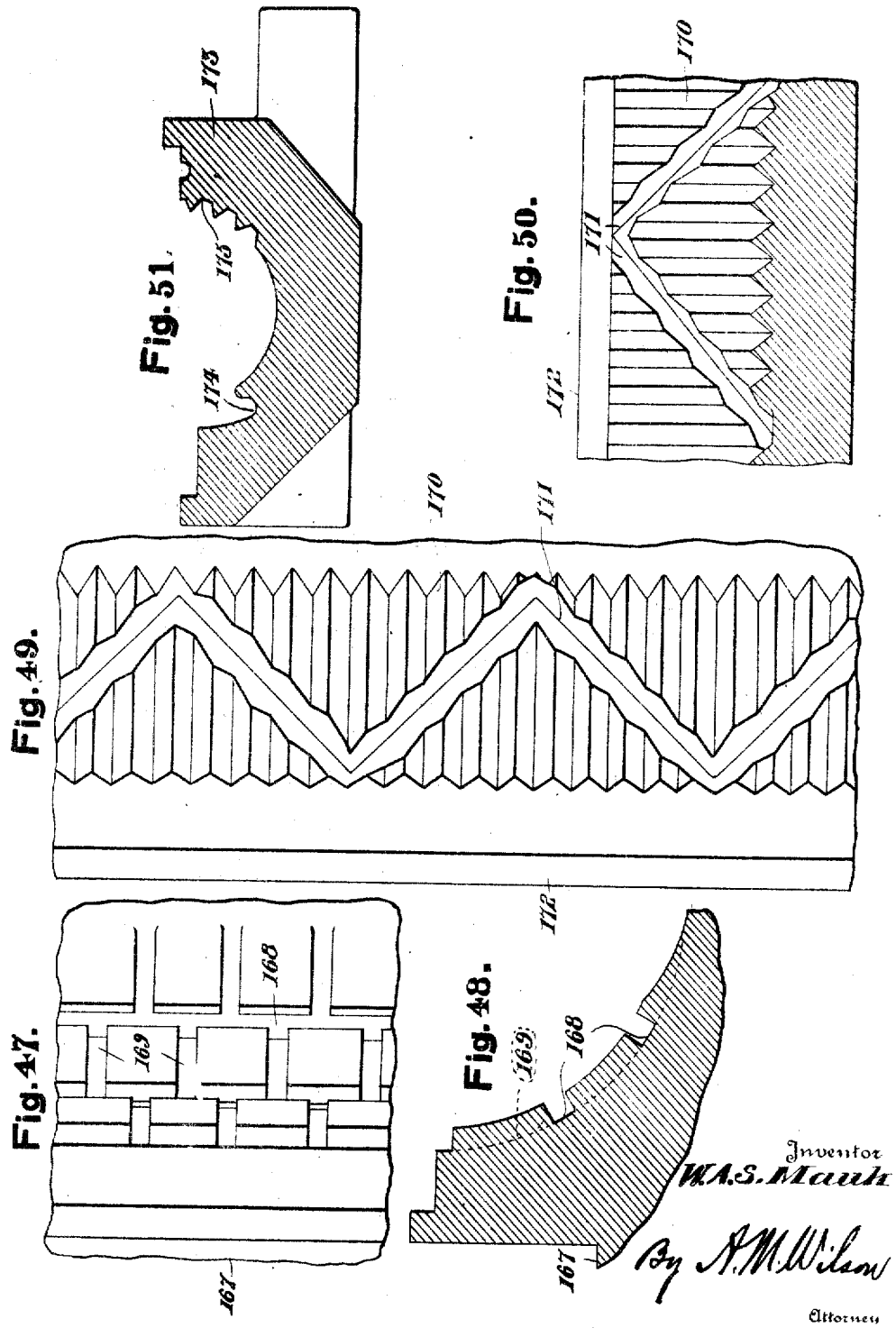

UNITED STATES PATENT OFFICE.

WILLIAM A. S. MAUK, OF BALTIMORE, MARYLAND.

TIRE-MOLD-FORMING MACHINE.

1,320,021.   Specification of Letters Patent.   Patented Oct. 28, 1919.

Application filed May 17, 1916. Serial No. 98,217.

*To all whom it may concern:*

Be it known that I, WILLIAM A. S. MAUK, a citizen of the United States, residing at Baltimore, State of Maryland, have invented certain new and useful Improvements in Tire-Mold-Forming Machines, of which the following is a specification.

This invention relates to certain new and useful improvements in tire mold forming machines.

The present machine is primarily designed for cutting molding members which are adapted to form desirable tread configurations upon a tire and is so arranged as to form a mold surface for producing any manner of non-skid tread that may be found desirable.

It will be understood that in the production of pneumatic tire shoes or casings provided with non-skid tread portions, a sectional and usually two-part metallic mold is employed for imparting the entire exterior form to the shoe and that arcuate portions of such mold sections are complementally formed with respect to the configuration of tread to be produced by the mold. The present device is designed for cutting such complemental tread forming surfaces within the mold sections as well as being capable of cutting longitudinal grooves, such as that required for the clencher flange of the shoe when desired.

The invention contemplates a cutter for mold faces arcuate in cross-section accurately adjustable for cutting rib producing grooves or depressions therein possessing uniformity throughout the annular length of the mold, the general direction of such grooves being either angular, rectilinear or curvilinear as determined by the operator.

In this cutting or forming of annular mold sections the invention provides a revolving horizontal table to which the mold section is secured while a tool holder longitudinally and vertically adjustable is oscillatingly mounted substantially centrally of the table adapted to maintain a cutting tool in operative position with respect to the said mold section while the table is turned at a desirable speed simultaneously with the oscillations of the tool holder, such movements of the table and holder being readily interrupted and changed in direction at the will of the operator. The present construction is such as to enable an accurate adjustment of the center of oscillations of the tool holder whereby the cutting tool moves in the required arcuate path contacting the concaved surface of the mold section for cutting grooves of a desirable uniform or graduated depth, longitudinal grooves being produced when the tool holder is stationary and the table with the mold section thereon turned beneath the spindle revolved cutting tool of the holder.

In the drawings forming a part of this application and in which like designating characters refer to corresponding parts throughout the several views:—

Fig. 3 is a vertical longitudinal central sectional view through the machine with the base broken away.

Fig. 4 is a vertical detail sectional view taken upon line IV—IV of Fig. 3, showing a hand wheel upon the vertical operating shaft for the tool holder.

Fig. 5 is a horizontal sectional view taken substantially upon line V—V of Fig. 1, with the outer gears in position and the housing and the table worm wheel shown in dotted lines.

Fig. 6 is a top plan view of the machine base.

Fig. 7 is a vertical fragmentary sectional view taken upon line VII—VII of Fig. 6.

Fig. 8 is a top plan view of the revolving table.

Fig. 9 is a radial vertical sectional view thereof taken upon line IX—IX of Fig. 8.

Fig. 10 is a top plan view of the main adjustable members detached from the base illustrated upon a reduced scale with parts broken away.

Fig. 11 is an enlarged central vertical sectional view through the sleeve actuating worm and adjustable stop mechanism.

Fig. 12 is a top plan view of the sleeve 105 employed with the tool holder.

Fig. 13 is an elevational view of the front end thereof.

Fig. 14 is a central longitudinal sectional view of the said sleeve.

Fig. 15 is a transverse sectional view, thereof taken upon the line XV—XV of Fig. 14.

Fig. 16 is an elevational view of the cutting spindle partially broken away.

Fig. 17 is a front end view thereof.

Figs. 18, 19 and 20 are opposite side and top elevations respectively, of the lower central bracket employed with the machine.

Figs. 21, 22 and 23 are side and front elevational and top plan views respectively, of the vertical motion bracket.

Figs. 24, 25 and 26 are side and front elevational and top plan views of the longitudinal slide.

Figs. 27, 28 and 29 are top plan and side and front end elevational views respectively, of the oscillating tool holder bracket.

Fig. 30 illustrates two side elevations of one of the retainers employed with the revolving table.

Figs. 31, 32 and 33 are three elevational views of the clutch shifting fork.

Figs. 34, 35 and 36 are three elevational views of the tool holder operating rack.

Figs. 37 and 38 are side elevation and top plan views respectively, of the worm gear operating device for the oscillating tool holder.

Figs. 39, 40 and 41 are top plan, side and front elevational views respectively of the tool holder bracket cap.

Figs. 42, 43 and 44 are elevational views of the cam or spiral employed with the clutch.

Figs. 45 and 46 are side and end elevational views of the clutch head.

Figs. 47 and 48 are interior elevational and transverse sectional views respectively, of portions of a mold section showing one configuration of molding face.

Figs. 49 and 50 are interior elevational and longitudinal sectional views of a portion of a mold section showing a different form of tread molding surface, and Fig. 51 is a transverse sectional view of a mold section showing another form of molding face.

Figures 1, 2:
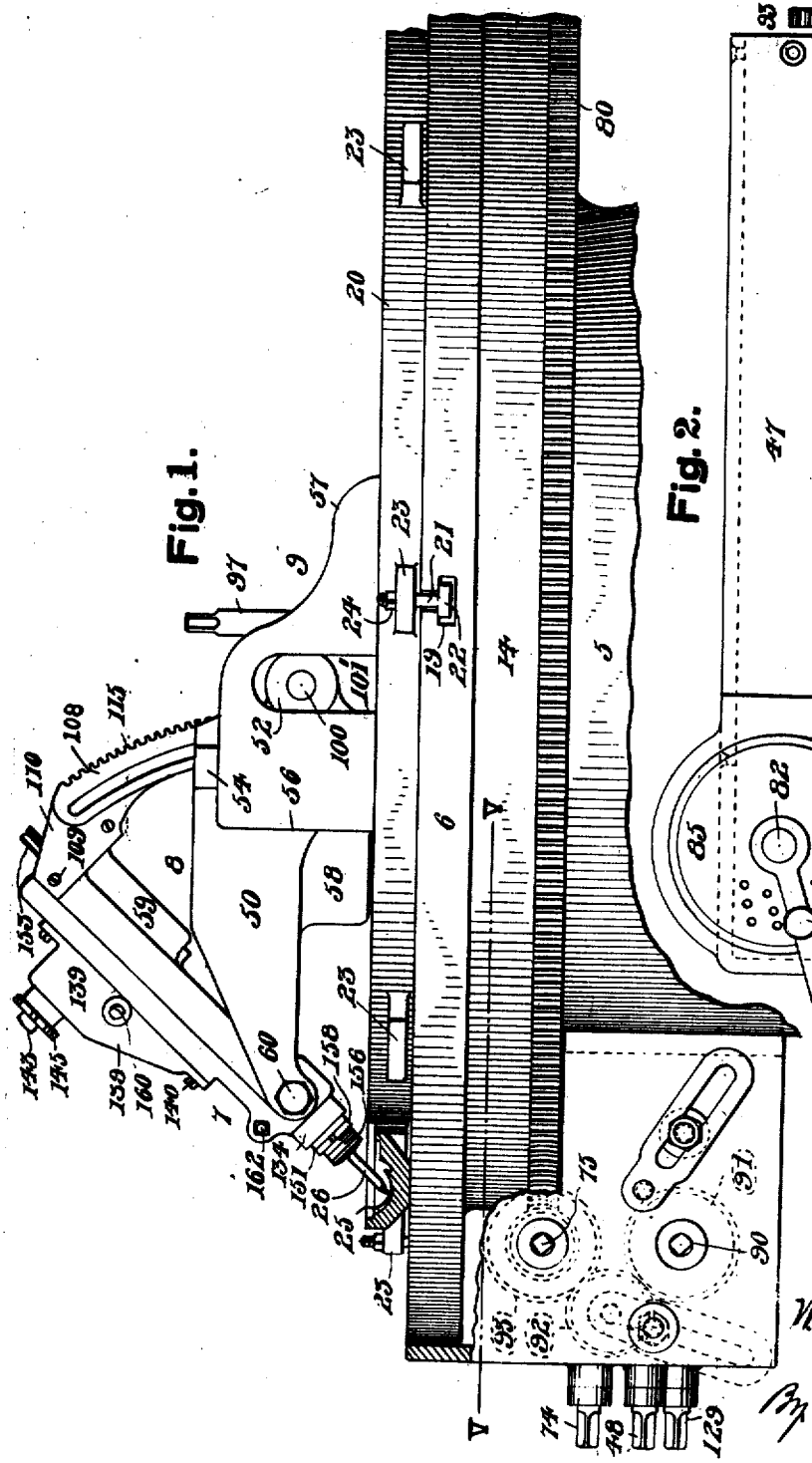
Figure 1 is a side elevation of the device partially broken away showing a mold section operatively positioned thereon during the cutting operation.
Fig. 2 is a front elevation of the forwardly arranged gear housing with which the device is provided.

The present machine for cutting tire tread designs in mold faces broadly consists of a hollow base 5 of frusto-conical form designed for mounting thereon a revolving circular work table 6 while a tool holder 7 is oscillatingly carried by a vertically adjustable bracket 8, said bracket being mounted in a longitudinally movable slide 9 carried by the top 10 of the said base and projecting through a circular central opening 11 in the said table.

The base 5 is provided with a circular annular rib 12 concentrically arranged thereon and adapted to receive an annular bearing groove 13 thereover formed in the lower face of the work table 6 marginally of the opening 11 thereof, the table being thus revolubly seated upon the base top 10 and having an annular depending flange 14 arranged outwardly of the projecting edge portion 15 of the base top 10. Retaining blocks 16 are secured to the table 6 at the angular connection of the flange 14 therewith being adapted to overlie the edge portions 15 of the base maintaining the table revolubly mounted thereon. The under face of the table is cut-away forming an annular clearance space 17 which corresponds with a similar cut-away clearance space 18 formed in the base top 10.

Radially arranged inverted T-shaped slots 19 are arranged in the table 6 for securing the work upon the upper face of the table. A mold member 20 is herein illustrated in Fig. 1 of the drawing of angular formation substantially semi-circular in cross-section and secured to the table 6 by means of bolts 21 having the heads 22 thereof removably arranged within the slots 19, the said bolts extending through projecting lugs 23 carried by the mold section 20 and retained in its adjusted position by means of lock nuts 24, it being understood that the table 6 is of sufficient size to accommodate mold sections of different diameters which sections when operatively positioned thereon are concentrically disposed with respect to the table, the concaved face 25 of the mold section 20 being arranged uppermost for the reception of the cutting tool 26 of the holder 7 adapted for operation in the manner hereinafter set forth.

A longitudinal opening 27 is arranged in the base top 10 extending substantially diametrically of the rib 12 and having a receiving notch 28 at its rear end. Longitudinally arranged seats 29 are oppositely arranged marginally of the top opening 27 and upon the said seats, the aforementioned slide 9 is arranged for shifting longitudinally by means of the opposite flanged longitudinal bottom portions 30 of the said slide. A shouldered cleat 31 is arranged outwardly of each of the seats 29 adapted for receiving strips 32 secured to the said cleats and overlying the base portions 30 for retaining the slide upon the base top.

A rearwardly disposed gear bracket 33 is dependently positioned with its upper end secured within the aforementioned notch 28 by means of hold-fast devices (not shown) engaging within perforations 34 of adjacent portions of the top 10. A lower bracket 35 is secured to the under surface of the depending bottom portion 36 of the slide 9 being attached thereto at points within the top opening 27 by means of bolts 37. The lower bracket 35 is provided with a longitudinal bore 38 having a threaded block 39 at its rear end adapted for the operative reception of an operating screw 40 for the said slide, the rear end of the screw 40 being journaled as at 41 in the bracket 33.

A relatively large gear 42 is carried by the screw 40 being in constant mesh with a smaller gear 43 mounted upon the slide shifting shaft 44, which shaft has its rear end journaled as at 45 in the bracket 33 and extends forwardly through an opening 46 in the front wall of the base 5 and thence extends through a gear housing 47 secured to the front wall of the base and is provided with a squared forward free end 48 adapted to receive a removable actuating wheel 49 or other similar means adapted to revolve the said shaft.

It will thus be understood that by turning the shaft 44, the slide 9 will be slidably shifted upon its seats 29 to the desired position, such movement of the slide being effected in either direction required longitudinally of the top opening 27.

The vertically movable bracket 8 of the form best illustrated in Figs. 21, 22 and 23 of the drawings is provided with spaced forwardly projecting arms 50 forwardly terminating in trunnioning bearings 51 and having rearwardly arranged lugs 52 provided with similar oppositely arranged bearings 53. Vertically positioned angular blocks 54 are carried upon the opposite sides of the bracket 8 being slidably arranged within corresponding grooves 55 inwardly arranged in the forward portions 56 of the sides 57 of the aforementioned slide 9.

The bracket 8 is provided with a curved bottom 58 between the side arms 50 adapted for the seating reception of the main body 59 of the tool holder 7 when the latter is arranged depressed, it being understood that a forward end of the tool holder is oscillatingly mounted in the bearings 51 by means of headed bolts 60 extending through the said bearings 51 and seated within threaded opposite sockets 61 in the forward end of the tool holder body 59.

The contracted base portion 62 of the bracket 8 is accommodated in the forward cut-away portion 63 of the slide 9 during the vertical adjustments of the bracket with the bracket blocks 54 arranged within the grooves 55 and is positioned at a point adjacent the forward end 64 of the lower bracket 35 when the vertical motion bracket 8 is in its lowered arrangement.

A vertically arranged screw 65 is operatively threaded through a block 66 carried by the bracket base 62 and extends within a vertical bore 67 of the bracket 8, the lower unthreaded end 68 of the screw 65 being journaled in said bracket end 64 and having a pinion 69 upon its lower end beneath the bracket end 64. A bracket adjusting shaft 70 is journaled through a depending lug 71 of the lower bracket 35 and is provided with a pinion 72 splined thereon and in constant mesh with the aforementioned pinion 69, the said shaft 70 being also journaled through a forward perforation 73 in the base 5 and extending through the housing 47 is provided with a squared forward end 74 similar to and positioned adjacent the aforementioned shaft end 48 and adapted to be revolved in a similar manner.

It will be understood that by turning the shaft 70, the pinions 69 and 72 will be revolved for turning the screw 65 and thus elevating the bracket 8 with the tool holder 7 thereon for adjusting the same to the desired height.

A worm shaft 75 is arranged within the gear housing 47 being journaled at one end in a bracket 76 positioned therein and at its other end in a boss 77 carried by the end 78 of the housing. A worm 79 is carried by the shaft 75 in constant mesh with a worm wheel or annular rack 80 secured to the bottom of the table flange 14 outwardly of and in contact with a depending shoulder 81 upon the inner edge of the said flange.

A stub shaft 82 is journaled in the outer end of the bracket 76 and extends through the side apron portion 83 of the gear housing 47 and is provided with an operating crank 84. An index plate 85 similar to those employed with milling machines is secured to the apron 83 concentrically disposed with respect to the shaft 82 being provided with a plurality of perforations 86 adapted for the reception of a spring-pressed latch 87. A pinion 88 secured to the stub shaft 82 is in constant mesh with a similar pinion 89 secured to the adjacent free end of the worm shaft 75 and whereby as will be readily understood, the turning of the crank 84 in either direction results in operating the worm 79 for turning the gear 80 and work table 6 in a revolving manner.

A lower shaft 90 is journaled longitudinally through the gear housing 47 beneath the worm shaft 75 and has its outer end provided with a gear 91 in mesh with an idler gear 92 which in turn meshes with a great 93 secured to the adjacent end of the worm shaft 75 and by means of which the revolving of either of the shafts 75 and 90 results in turning the other shaft at a relative speed dependent upon the relative ratio of the said gears 91, 92 and 93. An operating shaft 94 for the tool holder 7 is journaled through the gear housing 47 transversely thereof and also through the forward wall of the base 5 and is provided with a beveled gear 95 splined upon the inner free end of the shaft 94 and journaled in the depending arm 96 of the lower bracket 35. An upright operating shaft 97 for the tool holder 7 is journaled through a boss 98 at the lower end of the bracket 35 extending through a slot 176 in the the base top 10 and is provided with a relatively small beveled gear 99 in constant mesh with the shaft gear 95, the aforementioned hand wheel 49 being removably attached to the upper end of the said shaft 97.

A stub shaft 100 is journaled through the bosses 53 of the vertical motion bracket 8 and is provided with spaced gears 101 inwardly of the opposite sides 50 of the said bracket while one end of the shaft 100 projects through the adjacent vertical opening or slot 101' of the adjacent side wall 57 of the said bracket 9. The outer free end of said stub shaft 100 is provided with a worm rack or wheel 102 in constant mesh with a correspondingly toothed worm gear 103 which gear 103 is slidably splined to the said shaft 97. A two-part gear case 104 is provided for the gears 102 and 103 being mounted upon the shafts 97 and 100, and which shafts are arranged at right angles, the said gear case being shiftable with the said shafts both vertically and horizontally. Means is provided to prevent lost motion between the shaft 97, and the meshing worm and gear wheels 102 and 103 and includes a sleeve 105 encircling the shaft 97 and being exteriorly threaded for engagement with the gear case 104. The sleeve 105 at its lower end engages the upper plain edge of the gear 103, and when screwed home in the gear case, the gear 103 is forced downwardly to the limit of its movement over its splined connection with the shaft 97 to prevent the gear from freely sliding over the shaft. When the gear, worm and shaft are thus positioned by the sleeve, the lost motion between the parts is prevented, and the same are so retained by means of a set screw 106 carried by the case and engageably in desired peripheral notches 107 formed in the upper end of the sleeve 105. This construction is clearly shown in Figs. 37 and 38.

Segment racks 108 are secured to the opposite sides of the rear end of the tool holder body 59 by means of screws 109 extending through enlarged ends or heads 110 of the said racks 108 and engaging within threaded openings 111 of the holder body 59, it being noted that each rack head is provided with a rib 112 receivable within a groove 113 at the opposite sides of the rear projecting end 114 of the said body 59.

The racks 108 extend downwardly in an arcuate path through the vertical motion bracket 8 between the opposite sides 50 thereof having the teeth 115 of the racks 108 in constant mesh with the gears 101 of the stub shaft 100. It will be noted that the lower ends of the racks 108 project downwardly through the vertical motion bracket 8, the longitudinal slide 9 and also through the table opening 11 and base opening 27 when the tool holder 7 is in its lowered position as best illustrated in Fig. 3 of the drawing, the extreme upward position of the rack 108 and the tool holder 7 being shown by dotted lines in Fig. 3 as well as being illustrated in Fig. 1 of the drawings.

The tool holder operating shaft 94 is journaled through the opposite arms 116 of a bracket 117 within the gear housing 47 and is provided with two pinions 118 freely journaled thereon and in constant mesh with an intermediately positioned pinion 119 secured to the adjacent free end of the aforementioned operating shaft 90. A clutch member 120 in the form of a sleeve having opposite clutching end faces is splined upon the said shaft 94 and adapted for clutching with clutching hubs 121 carried by the inner ends of the aforementioned pinions 118. A shifting fork 122 for the clutch member 120 engages within the groove 123 of the said clutch member in the usual manner and is provided with spaced oblique lugs 124 adapted for the reception of a shifting spiral or cam 125 positioned between the said lugs. The fork 122 has its opposite arms provided with bosses 126 through which a clutch controlling shaft 127 is journaled, the said shaft being also journaled through the bracket arms 116 in parallelism with the shaft 94 and having a turn crank 128 upon its outer end while the spiral 125 is fixed to the shaft 127 intermediate the said bosses 126.

It will thus be apparent that the clutch member 120 may be positioned by means of the crank 128 in its neutral arrangement as illustrated in Fig. 5 of the drawing without connecting the shaft 94 to either of the pinions 118 and at which times the crank 84 may be turned for freely operating the worm 79 and turning the work table 6 in the desired direction. When however, it is desired to oscillate the tool holder 7 simultaneously with the turning of the table 6, the clutch crank 128 is turned for shifting the clutch member 120 into engagement with a selected one of the pinions 118, thereby connecting up the shafts 75 and 94 for turning the shaft 94 in either desired direction during the forward motion of the work table 6. It will also be seen that the shaft 94 may be operated by positioning such a member as the turn wheel 49 upon the free squared end 129 of the shaft 94 and whereby the said shaft will be turned for oscillating the tool holder 7 in the desired direction as well as for revolving the work table 6 when the clutch member 120 is operatively shifted. The shaft 97 being arranged for turning the stub shaft 100 by means of the worm gears 102, 103, it will be seen that the tool holder 7 may be directly operated thereby through the agency of the turn wheel 49 when attached to the vertical shaft 97 and while this manner of operating the tool holder is ordinarily desirable only when the clutch member 120 is inoperatively positioned, it will of course be apparent that the turning of the vertical shaft 97 not only turns the stub shaft 100 but also the shaft 94 which will result in revolving the work table 6 when the clutch member 120 is in clutching engagement with either of the pinions 118. The clutch lever or crank 128 is provided with a spring-pressed knob 130 having a pin 131 adapted to enter any one of three sockets 132 arranged in spaced relations in the front plate of the gear housing 47 when the clutch 120 is either inoperatively or operatively arranged.

The tool holder body 59 is provided with a longitudinal bore 133 having a spindle sleeve 134 longitudinally slidable therein being prevented from relative rotation by means of a splined connection 135 as well as by means of a rack 136 secured to a seating socket 137 arranged longitudinally of the said sleeve, the said rack 136 extending through a longitudinal slot 138 in the upper side of the holder body 59.

A housing cap 139 is secured to the upper side of the body 59 and overlying the slot 138 being removably secured to said body by means of the bolts 140.

An operating worm 141 for longitudinally moving the sleeve 134 is carried by a stub shaft 142 journaled in the cap 139 and having an angular outwardly projecting head 143 whereby the said worm 141 may be turned. A centrally projecting stud 163 carried by the worm 141 is seated in a thrust bearing or socket 164 in the upper face of the holder body 59. A gear 144 is journaled within the cap 139 by means of a shaft 165 extending through perforations 166 being in constant mesh with the aforementioned rack 136 and the worm 141 so that a turning of the shaft 142 longitudinally actuates the said sleeve 134. A stop nut 145 is screw-threaded upon the shaft 142 and an engaging key 146 is provided and adapted for reception within the notches 147 of the said stop nut, it being understood that the nut 145 may be thus arranged at any desired height above the top edge 148 of the cap 139 for adjustably limiting the rotary movement of the shaft 142 in one direction. It will be seen that, with the parts arranged as shown in Fig. 11, if shaft 142 is rotated, nut 145 will be moved longitudinally thereon due to the screw-threaded connection between the nut and the shaft and the holding of the nut from rotation by key 146. Thus, when the upper face of the nut moves into engagement with the top edge 148 of the cap 139, further rotation of said shaft 142 is prevented, and consequently the longitudinal movement of sleeve 134 is limited. The longitudinal movement of the sleeve 134 is also limited by the length of the aforementioned slot 138.

An operating spindle 149 is revolubly journaled within the bore 150 of the sleeve 134, the said spindle having a limiting flange 151 at its forward end adapted to engage the forward end of the sleeve 134 which end is provided with an annular receiving groove 152 adapted for the reception of any desirable form of packing or anti-friction members. The opposite end of the spindle 149 is reduced as at 153 for the reception of limiting disks 154 which are secured to the spindle for engaging the rear end of the sleeve 134. A flattened connecting tang 155 is carried by the extreme rear end of the spindle 149 adapted for connection to any desirable means such as flexible shafting designed for operatively revolving the spindle 149 for operating the cutting tool or bit 26 which is attached to the forward end of the spindle 149 by any desirable means, such as a drill chuck 156 secured within the receiving socket 157 of the spindle and retained by means of a locking washer 158 attached to the forwardly projecting externally threaded collar 159 thereof. The forward end of the holder body 59 is provided with a longitudinal slot 160 communicating with the bore 133 while opposite lugs or ears 161 are carried by the said body, being adjustably connected by means of a bolt 162 and whereby the frictional engagement of the sliding sleeve 134 may be slightly adjusted as desired.

The operation of each portion of the machine having been specifically described in connection with the work or mold section 25 secured to the work table 6, the complete operation of the device in cutting the desired tread forming mold faces will be fully understood. Referring to Figs. 47 and 48 of the drawings, it will be noted that a portion of a mold section 167 is illustrated in which only longitudinal grooves or depressed valleys 168 and similar transverse connecting grooves 169 are employed, such form of mold face being designed for producing a tire tread similar to that disclosed in my Design Patent #48,789, dated March 28, 1916.

For producing the grooves 168 in the section 167 by means of the present machine, it is only necessary to adjust the cutting tool 26 at the desired point and then independently revolve the table 6 by means of the operating crank 84 with the clutch 120 inoperatively positioned. When desired to cut the transverse grooves 169, the work table 6 remains stationary, the clutch 120 being in its inoperative position and the tool holder 7 is oscillated preferably by means of the operating shaft 94, although such movement may be effected by turning the vertical shaft 97.

The form of molding surface illustrated in Figs. 49 and 50 of the drawings consists of the transverse grooves 170 and the longitudinal zig-zag or oblique continuous groove 171. The transverse grooves 170 may be formed by placing a desirable cutting tool 26 within the chuck of the tool holder 7 and oscillating the tool holder by means of the shaft 94 while the clutch 120 is in its inoperative position while the work table 6 is revolved independently by means of the hand wheel 84 for cutting each successive transverse groove, it being noted that the table 6 may be locked in the desired position for cutting the grooves contiguous to each other or in separated parallel relations by setting the latch 87 of the operating crank 84 in the required sockets 86 of the index plate 85.

The groove 171 is cut in the mold section 172 by beginning the oblique cutting operation at one marginal edge of the transverse grooves 170 with the clutch member 120 in its operative position for moving the cutter 26 transversely of the mold section 172, it being understood that on account of the closed position of the clutch 120, a turning of the crank 84 simultaneously revolves the work table 6 and the mold section 172 with such oscillating movement of the tool holder 7, thus cutting one length or oblique portion of the groove 171. When the opposite margins of the grooves 170 are reached, the clutch lever 128 is shifted to cause the tool holder to be oscillated in an opposite direction and the continued movement of the section 172 allows the cutter to complete the succeeding oppositely oblique portion of the said groove, it being understood that the cutter 26 is continuously revolved by means of the spindle connection 155.

In the mold section shown in Fig. 51 at 173, the clencher flange or bead forming longitudinal groove 174 is shown which is preferably milled or otherwise formed in the said section 173 prior to placing the same upon the work table 6 of the present machine. Such groove 174 however, may be formed by the present machine by properly setting the tool 26 with the tool holder 7 in a fixed position and then revolving the work table 6 and mold section 173 by means of the crank 84. When only a series of peripheral longitudinal ribs are desired to be formed upon the tread of the tire, a desired number of concentric grooves 175 are formed in the concaved mold face of the section 173 in a similar manner to that just described with respect to the bead groove 174.

As previously noted, the shaft 94 is designed for oscillating the tool holder 7 either simultaneously with or independently of the movements of the work table 6 as controlled by the clutch member 120 while the vertical shaft 97 is designed for returning the tool holder 7 to its normal position as well as to any position desired for beginning the cutting operation. The slide 9 actuated by the shaft 44 for movements longitudinally of the machine and radially of the work table 6 is arranged for accurately positioning the tool holder 7 at the desired radial adjustment for operating upon an annular mold section 25 of any diameter within the limits of the present machine while the height of the pivot 60 of the tool holder 7 is controlled by the vertical motions of the bracket 8 effected by means of the shaft 70. The cutter 26 is readily projected and retracted at will as quickly as desirable by means of the shaft 142 regulated by the stop nut 145 so that the depth of the grooves cut within the section 25 upon the table 6 may be altered simultaneously with the oscillatory movements of the tool holder 7 and the revolving movements of the work holder 6 and mold section 25.

While it will be understood that many changes may be made in the form and contour of the device, it will be understood that such changes are only limited by the spirit and scope of the invention as set forth in the appended claims.

What I claim as new is:—

1. A mold making machine comprising a supporting base member, a revoluble work table mounted thereon, a longitudinally and vertically movable bracket carried by the said supporting base member, and an oscillatory cutter holder carried by and pivoted to the said bracket adjacent the said table.

2. A mold cutter comprising a supporting base member, a revolving table carried by the said supporting base member, a longitudinally shiftable bracket carried by said supporting base member having a path of movement radially of the said table, and a cutter holding member pivoted upon the said bracket above the said table and adapted to be oscillated during the cutting operation.

3. A mold cutter comprising a support, a revolving table carried by the said support, a longitudinally shiftable slide carried by said support having a path of movement radially of the said table, a vertically movable bracket carried by the said slide and extending radially of the said table, and a tool holder pivoted to the free end of the said bracket with its tool holding end arranged above the said table and adapted to be oscillated during the cutting operation.

4. A mold cutter comprising a base, a work supporting table revolubly mounted upon the said base and having a central opening therein, a longitudinally movable slide mounted upon the said base within the said table opening, actuating means for the said slide, and a vertically shiftable oscillatory tool holder supported by the said slide with one end thereof operatively positioned above the said table.

5. A mold cutter comprising a base, a work supporting table revolubly mounted upon the said base and having a central opening therein, a longitudinally movable slide mounted upon the said base within the said table opening, actuating means for the said slide, a vertically shiftable oscillatory tool holder supported by the said slide with one end thereof operatively positioned above the said table, and vertical shifting and oscillating means for the said tool holder.

6. A mold cutter comprising a base, a work table revolubly mounted upon the said base and having a central opening therein, a longitudinally movable slide mounted upon the said base within the said table opening, actuating means for the said slide, a vertically movable bracket mounted upon the said slide and having its free end positioned above the said table, and a tool holder oscillatingly mounted upon the free end of said bracket.

7. A mold cutting machine including a support, a revoluble table carried by said support, said table being adapted for the reception and retention thereon of a tire mold section disposed with its molding face exposed, a movable cutting tool holder carried by said support and adapted to hold a cutting tool adjacent a portion of the molding face of the tire mold section, means for revolving said table, and a plurality of controllable means for moving said tool holder, each of said last named means imparting simultaneous distinctive movements to said tool holder whereby a plurality of forms of grooves may be selectively cut in the molding face of the mold section.

8. A mold forming machine comprising a base having a longitudinal opening therein, a work supporting table revolubly mounted upon the said base and provided with a central circular opening, a longitudinally movable slide carried by the said base having a portion depending within the said base opening, the main portion of the said slide extending through the said table opening, a gear bracket secured within the rear end of the said base opening, operating means for the said slide carried by the said bracket and base, and a vertically adjustable oscillatory tool holder supported by the said slide.

9. A mold forming machine comprising a base having a longitudinal opening therein, a work supporting table revolubly mounted upon the said base and provided with a central circular opening, a longitudinally movable slide carried by the said base having a portion depending within the said base opening, the main portion of the said slide extending through the said table opening, a gear bracket secured within the rear end of the said base opening, operating means for the said slide carried by the said bracket and base, a vertically adjustable oscillatory tool holder supported by the said slide, and separate means carried by the said base and slide for vertically and oscillatingly moving the said tool holder.

10. A mold forming machine comprising a base having a longitudinal opening therein, a work table revolubly mounted upon the said base and provided with a central circular opening, a longitudinally movable slide carried by the said base having a portion depending within the said base opening, the main portion of the said slide extending through the said table opening, a gear bracket secured within the rear end of the said base opening, operating means for the said slide carried by the said bracket and base, a vertically movable bracket carried by the said slide, actuating means for the said bracket operable forwardly of the said base, and an oscillatory tool holder carried by the said bracket above the said table, and oscillating means for the said tool holder carried by the said bracket and operable from points above and forwardly of the said slide and base.

11. A mold cutter comprising a base, a work table revolubly mounted upon the said base and having a central opening therein, a longitudinally movable slide mounted upon the said base within the said table opening, actuating means for the said slide, a vertically movable bracket mounted upon the said slide and having its free end positioned above the said table, a tool holder oscillatingly mounted upon the free end of said bracket, separate operating means for the said bracket and tool holder, a longitudinal shiftable cutting spindle revolubly journaled within the said tool holder, and adjustable longitudinal operating means for the said spindle carried by the said tool holder.

12. A mold forming machine comprising a base having a longitudinal opening therein, a work table revolubly mounted upon the said base and provided with a central circular opening, a longitudinally movable slide carried by the said base having a portion depending within the said base opening, the main portion of the said slide extending through the said table opening, a gear bracket secured within the rear end of the said base opening, operating means for the said slide carried by the said bracket and base, a vertically adjustable oscillatory tool holder supported by the said slide, a longitudinal shiftable cutting spindle revolubly journaled within the said tool holder, and adjustable longitudinal operating means for the said spindle carried by the said tool holder.

13. A mold forming machine comprising a base having a longitudinal opening therein, a work table revolubly mounted upon the said base and provided with a central circular opening, a longitudinally movable slide carried by the said base having a portion depending within the said base opening, the main portion of the said slide extending through the said table opening, a gear bracket secured within the rear end of the said base opening, operating means for the said slide carried by the said bracket and base, a vertically adjustable oscillatory tool holder supported by the said slide, separate means carried by the said base and slide for vertically and oscillatingly moving the said work holder, a longitudinal shiftable cutting spindle revolubly journaled within the said tool holder, and adjustable longitudinal operating means for the said spindle carried by the said tool holder.

14. A mold forming machine comprising a base having a longitudinal opening therein, a work table revolubly mounted upon the said base and provided with a central circular opening, a longitudinally movable slide carried by the said base having a portion depending within the said base opening, the main portion of the said slide extending through the said table opening, a gear bracket secured within the rear end of the said base opening, operating means for the said slide carried by the said bracket and base, a vertically movable bracket carried by the said slide, actuating means for the said bracket operable forwardly of the said base, an oscillatory tool holder carried by the said bracket above the said table, oscillating means for the said tool holder carried by the said bracket and operable from points above and forwardly of the said slide and base, a longitudinal shiftable cutting spindle revolubly journaled within the said tool holder, and adjustable longitudinal operating means for the said spindle carried by the said tool holder.

15. A mold forming machine comprising a support, a work table rotatably mounted thereon, a tool holder relatively adjustable vertically and longitudinally of the said support, the said tool holder being mounted for vertical oscillating movement above the said support.

16. A mold forming machine comprising a support, a work table rotatably mounted thereon, a tool holder relatively adjustable vertically and longitudinally of the said support, the said tool holder being oscillatingly mounted above the said support and having a tool engaging end provided with an adjustable arcuate path of movement above the said table, and oscillation imparting means for the said tool holder operable at points both above and forwardly of the machine.

17. A mold cutting machine comprising a base member, a work table revolubly mounted thereon, an oscillatory tool with the oscillatory pivot intersecting the tool carried by said base member, and means for simultaneously actuating the said table and tool.

18. A mold cutting device comprising a base, a work table revolubly mounted thereon, a longitudinal shiftable slide carried by the said base, an oscillatory tool holder vertically adjustably carried by the said slide, combined simultaneously operable oscillating means for the said tool holder, and revolving means for the said table adapted for actuation at points either above or forwardly of the said machine.

19. A mold cutting device comprising a base, a work table revolubly mounted thereon, a longitudinal shiftable slide carried by the said base, an oscillatory tool holder vertically adjustably carried by the said slide, combined simultaneously operable oscillating means for the said tool holder, revolving means for the said table adapted for actuation at points either above or forwardly of the said machine, and an oscillatory movement interrupting and direction changing means including a clutch independently operable with respect to said oscillating and revolving means.

20. A mold cutting machine comprising a base, a work table revolubly mounted upon the said base, a vertically longitudinally movable and longitudinally shiftable support upon the said base, a tool holder oscillatingly mounted upon said support, revolving means for the said table, oscillating means for the said tool holder, and direction controlling operative connections between the said table revolving means and oscillating means.

21. A mold cutting machine comprising a base, a work table revolubly mounted upon the said base, a vertically longitudinally movable and longitudinally shiftable support upon the said base, a tool holder oscillatingly mounted upon said support, revolving means for the said table, oscillating means for the said tool holder, direction controlling operative connections between the said table revolving means and oscillating means, and elevating and lowering means for the said support operable forwardly of the machine.

22. A mold cutting machine comprising a base, a work table revolubly mounted upon the said base, a vertically longitudinally movable and longitudinally shiftable support upon the said base, a tool holder oscillatingly mounted upon said support, revolving means for the said table, oscillating means for the said tool holder, direction controlling operative connections between the said table revolving means and oscillating means, separate vertical adjusting and longitudinal shifting means for the said support carried by the latter and said base adapted for actuation forwardly of the said machine.

23. A mold cutting machine comprising a base, a work table revolubly mounted upon the said base, a vertically longitudinally movable and longitudinally shiftable support upon the said base, a tool holder oscillatingly mounted upon said support, revolving means for the said table, oscillating means for the said tool holder, direction controlling operative connections between the said table revolving means and oscillating means, and a longitudinally shiftable spindle revolubly journaled in the said tool holder and adjustable longitudinal shifting means therefor.

24. A groove cutter including a support, a revoluble work table carried by said support and adapted for the reception and retention thereon of an annular body having a concaved side face, means for revolving said table, a movable tool holder carried by said support and adapted to hold a cutting tool adjacent a portion of the concaved side face of the annular body, and a plurality of controllable means for moving said tool holder, each of said last-named means imparting simultaneous distinctive movements to said tool holder whereby a plurality of forms of grooves may be selectively cut in the concaved side face of the annular body.

25. A mold cutting machine comprising a base, a work table revolubly mounted upon the said base, a vertically longitudinally movable and longitudinally shiftable support upon the said base, a tool holder oscillatingly mounted upon said support, revolving means for the said table, oscillating means for the said tool holder, direction controlling operative connections between the said table revolving means and oscillating means, separate vertical adjusting and longitudinal shifting means for the said support carried by the latter and said base adapted for actuation forwardly of the said machine, a longitudinal shiftable spindle revolubly journaled in the said tool holder and adjustable longitudinal shifting means therefor.

26. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, and an oscillatory holder adjustably carried by the said slide.

27. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, a vertically movable bracket guidingly mounted upon the said slide, adjusting means for the said bracket, and a tool holder oscillatingly mounted upon the forward free end of the said bracket.

28. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, a vertically movable bracket guidingly mounted upon the said slide, adjusting means for the said bracket, a tool holder oscillatingly mounted upon the forward free end of the said bracket, and oscillating means for the said tool holder adapted for independent actuation at points above and forwardly of the said machine.

29. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, an oscillatory holder adjustably carried by the said slide, and oscillating means for the said tool holder adapted for independent actuation at points above and forwardly of the said machine.

30. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, a vertically movable bracket guidingly mounted upon the said slide, adjusting means for the said bracket, a tool holder oscillatingly mounted upon the forward free end of the said bracket, oscillating means for the said tool holder adapted for independent actuation at points above and forwardly of the said machine, a work table revolubly mounted upon the said base, revolution imparting means for the said table, and clutch controlled operative connections between the said table revolving means and tool holder oscillating means.

31. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, an oscillatory tool holder adjustably carried by the said slide, oscillating means for the said tool holder adapted for independent actuation at points above and forwardly of the said machine, a work table revolubly mounted upon the said base, revolution imparting means for the said table, and clutch controlled operative connections between the said table revolving means and tool holder oscillating means.

32. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, an oscillatory holder adjustably carried by the said slide, a longitudinally adjustable sleeve splined to the said tool holder, an operating spindle journaled in the said sleeve, and regulated actuating means for the said sleeve.

33. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, a vertically movable bracket guidingly mounted upon the said slide, adjusting means for the said bracket, a tool holder oscillatingly mounted upon the forward free end of the said bracket, a longitudinally adjustable sleeve splined to the said tool holder, an operating spindle journaled in the said sleeve, and regulated actuating means for the said sleeve.

34. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, a vertically movable bracket guidingly mounted upon the said slide, adjusting means for the said bracket, a tool holder oscillatingly mounted upon the forward free end of the said bracket, oscillating means for the said tool holder adapted for independent actuation at points above and forwardly of the said machine, a longitudinally adjustable sleeve splined to the said tool holder, an operating spindle journaled in the said sleeve, and regulated actuating means for the said sleeve.

35. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, an oscillatory holder adjustably carried by the said slide, oscillating means for the said tool holder adapted for independent actuation at points above and forwardly of the said machine, a longitudinally adjustable sleeve splined to the said tool holder, an operating spindle journaled in the said sleeve, and regulated actuating means for the said sleeve.

36. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, a vertically movable bracket guidingly mounted upon the said slide, adjusting means for the said bracket, a tool holder oscillatingly mounted upon the forward free end of the said bracket, oscillating means for the said tool holder adapted for independent actuation at points above and forwardly of the said machine, a work table revolubly mounted upon the said base, revolution imparting means for the said table, clutch controlled operative connections between the said revolving means and oscillating means, a longitudinally adjustable sleeve splined to the said tool holder, on operating spindle journaled in the said sleeve, and regulated actuating means for the said sleeve.

37. A mold cutting device comprising a base having an elongated opening therein provided with a notch at its rear end and further having guide seats longitudinally arranged at opposite sides of the said opening, a longitudinal shiftable slide positioned upon the said seats spanning and projecting inwardly of the said opening, a depending rear bracket secured within the said notch, an operating shaft extending forwardly of the machine and journaled in the said base and rear bracket, a lower bracket carried by the said slide, operative connections between the said shaft and lower bracket, an oscillatory holder adjustably carried by the said slide, oscillating means for the said tool holder adapted for independent actuation at points above and forwardly of the said machine, a work table revolubly mounted upon the said base, revolution imparting means for the said table, clutch controlled operative connections between the said revolving means and oscillating means, a longitudinally adjustable sleeve splined to the said tool holder, an operating spindle journaled in the said sleeve, and regulated actuating means for the said sleeve.

38. A mold cutting machine comprising a revolubly mounted work holder, a tool mounted for vertical oscillation with the oscillatory pivot intersecting the tool and means for simultaneously operating the work holder and the tool.

39. A mold cutting machine comprising a base member, a work holder revolubly and a tool holder oscillatingly mounted upon the said base member, and simultaneous actuating means for the said holders operable at points both above and forwardly of the said cutting machine.

40. A mold cutting machine comprising a base member, a work holder revolubly and a tool holder oscillatingly mounted upon the said base member, simultaneous actuating means for the said holders operable at points both above and forwardly of the said cutting machine, and controlling means co-operating with the said actuating means whereby the direction of oscillations of the said tool holder is changeable at will.

41. A machine of the type described including a work-holder and a pivotally mounted cutting tool, with the pivot intersecting the cutting tool, the parts when operated being simultaneously moved, one part in a direction at right angles to the other part with the cutting member oscillating on the pivot thereof.

42. A machine of the type described including a work-holder and a pivotally mounted cutting tool, with the pivot intersecting the cutting tool, the parts when operated being simultaneously moved, one part moving in a horizontal plane and the other part at right angles thereto with the cutting member oscillating on the pivot thereof.

In testimony whereof I affix my signature.

WILLIAM A. S. MAUK.